(12) United States Patent
Cutshall

(10) Patent No.: US 6,644,902 B1
(45) Date of Patent: Nov. 11, 2003

(54) CAGE-NUT ASSEMBLY

(75) Inventor: Mark L. Cutshall, Plymouth, MI (US)

(73) Assignee: E & E Manufacturing Company, Inc., Plymouth, MI (US)

( * ) Notice: Subject to any disclaimer, the term of this patent is extended or adjusted under 35 U.S.C. 154(b) by 0 days.

(21) Appl. No.: 09/626,610

(22) Filed: Jul. 27, 2000

Related U.S. Application Data

(60) Provisional application No. 60/175,593, filed on Jan. 11, 2000.

(51) Int. Cl.[7] ............................................. F16B 39/284
(52) U.S. Cl. ........................ 411/111; 411/104; 411/171
(58) Field of Search ........................ 411/104, 111–114, 411/470, 469, 171

(56) References Cited

U.S. PATENT DOCUMENTS

| | | | |
|---|---|---|---|
| 2,631,634 A | * | 3/1953 | Tinnerman |
| 2,635,666 A | * | 4/1953 | Murphy |
| 2,678,075 A | * | 5/1954 | Murphy |
| 2,695,046 A | * | 11/1954 | Tinnerman |
| 2,727,552 A | * | 12/1955 | Chvosta |
| 2,875,805 A | * | 3/1959 | Flora |
| 3,217,772 A | * | 11/1965 | Adams |
| 4,074,011 A | * | 2/1978 | Teramae |
| 4,232,497 A | * | 11/1980 | Meschnig ................ 411/171 |
| 4,543,704 A | * | 10/1985 | Soussloff |
| 4,875,816 A | | 10/1989 | Peterson |
| 4,923,347 A | * | 5/1990 | Moryl |
| 5,096,350 A | | 3/1992 | Peterson |
| 5,193,643 A | * | 3/1993 | McIntyre |
| 5,380,136 A | * | 1/1995 | Copple |
| 5,630,686 A | * | 5/1997 | Billmann |
| 5,676,510 A | * | 10/1997 | Fischer .................... 411/171 |

FOREIGN PATENT DOCUMENTS

| | | | |
|---|---|---|---|
| EP | 0 636 800 A1 | 2/1995 | |
| FR | 1 564 898 | 4/1969 | |
| FR | 2583469 | * 12/1986 | ................ 411/112 |
| FR | 2 756 601 | 6/1998 | |

OTHER PUBLICATIONS

European Search Report, Apr. 24, 2001.

* cited by examiner

Primary Examiner—Flemming Saether
(74) Attorney, Agent, or Firm—Brooks Kushman P.C.

(57) ABSTRACT

A cage-nut assembly includes a nut positioned within a cage structure. The cage structure is configured to provide high torsional strength to prevent rotation of the nut. The cage structure has a flat base and an at least partially open end portion. The cage structure includes a blocking member preventing the nut from moving laterally along the base through the at least partially open end portion. The blocking member is relatively structurally weak in a direction orthogonal to a torsional rotation direction of the nut. The structurally weak blocking member is bendable when less than approximately 20 lbs. of force is applied to the blocking member to open the end portion and allow the nut to move laterally along the base through the end portion for removal of the nut.

7 Claims, 6 Drawing Sheets

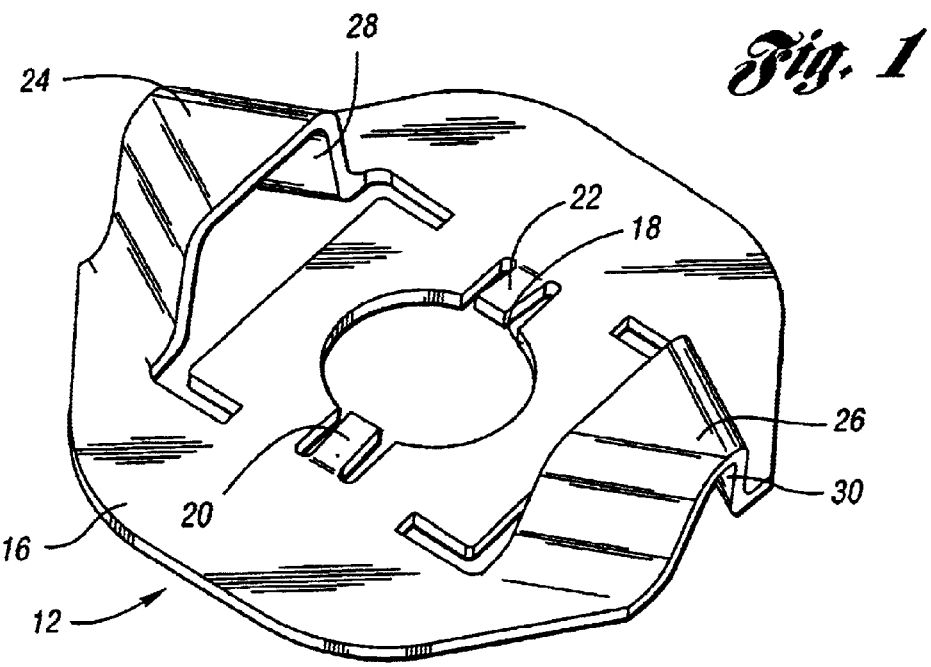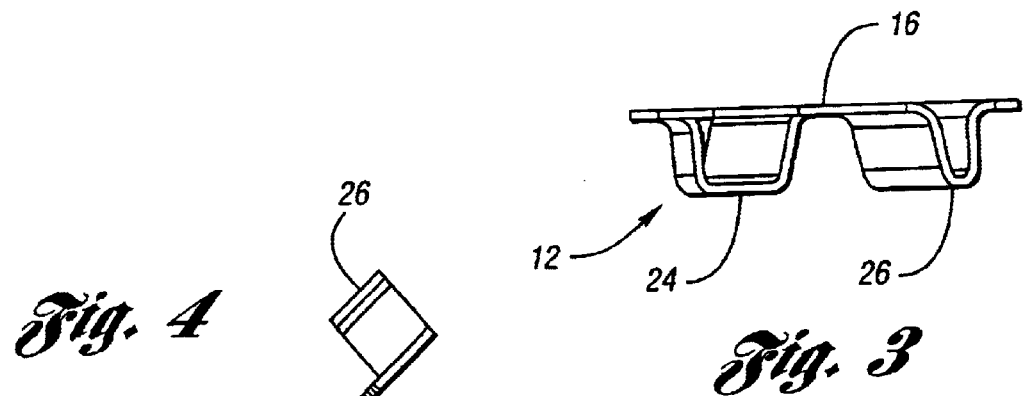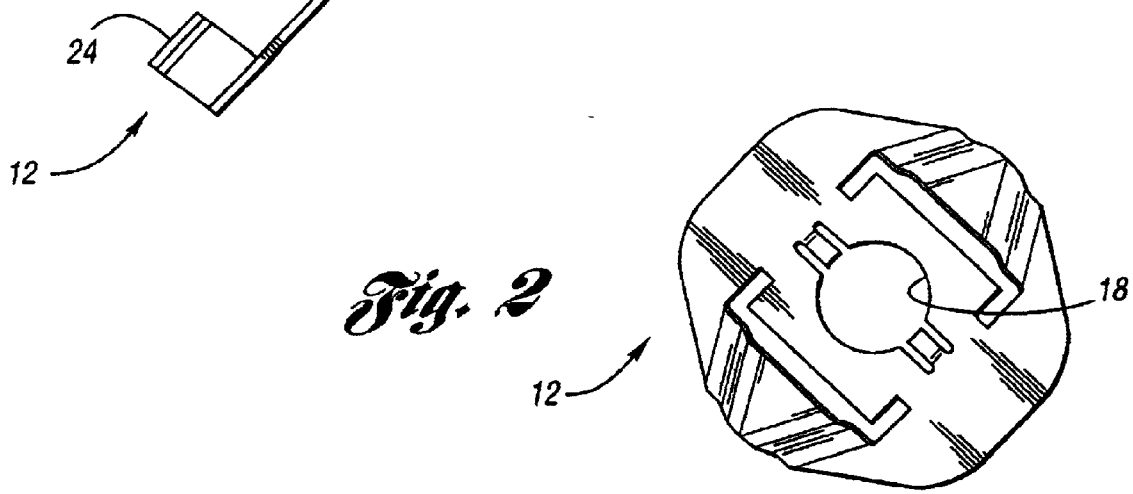

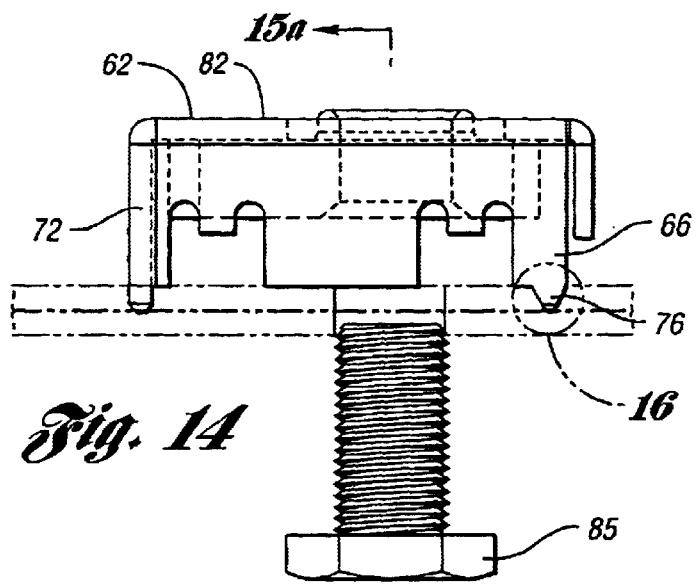
*Fig. 14*
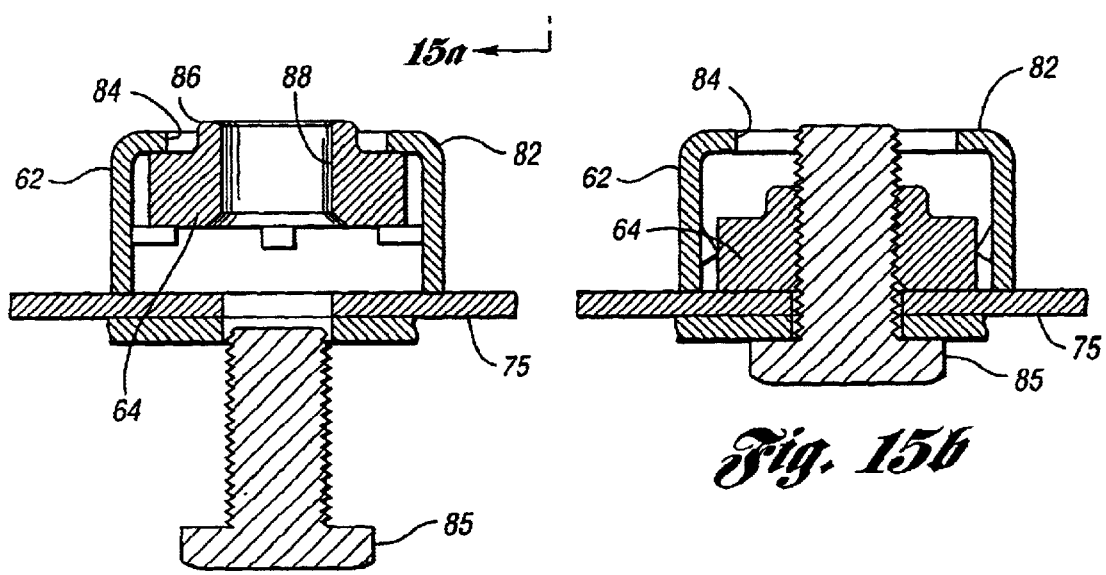
*Fig. 15a*  *Fig. 15b*
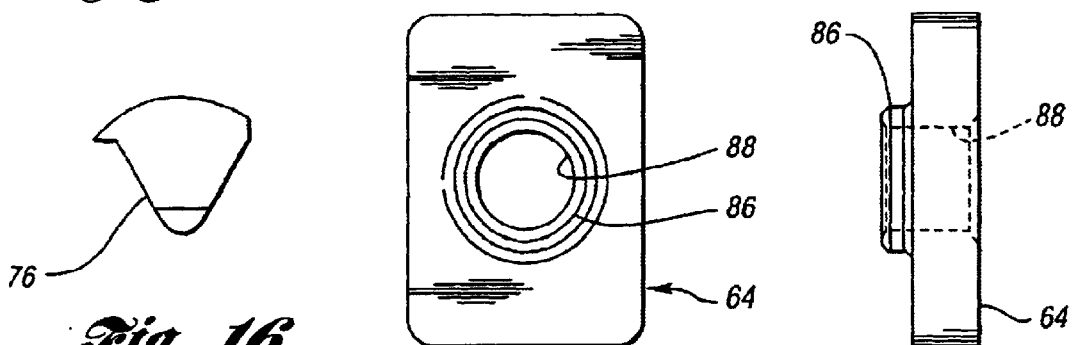
*Fig. 16*  *Fig. 17*  *Fig. 18*

CAGE-NUT ASSEMBLY

CROSS-REFERENCE TO RELATED APPLICATION

This application claims the benefit of U.S. provisional application Ser. No. 60/175,593, filed Jan. 11, 2000.

TECHNICAL FIELD

The present invention relates to caged female threaded fasteners which provide high torsional strength while allowing removal of the fasteners for servicing.

BACKGROUND ART

It is a common manufacturing practice to apply coatings of paint or other decorative or protective coatings to large subassemblies prior to final assembly of the completed product. For example, in the manufacture of automobiles, the body of the automobile will be formed and assembled, and then painted. Other automotive subassemblies, such as suspension parts, undercarriages, or closures for the automobile (such as the doors, hood, and trunk lid) are separately manufactured and painted, and are assembled with the painted automobile body to form a complete automobile.

In most cases, the subassemblies of the automobile will be secured to the auto body by threaded fasteners. However, the use of threaded fasteners often presents difficulties in final assembly. For example, in the case of assembling a door into a body, one of the matching threaded fasteners, for example, a female fastener, may be located inside a door pillar. The door pillar in a modern automobile of unibody construction very often is a hollow metal part which may be completely enclosed after manufacture of the vehicle body. In order to provide a female fastener inside the pillar, it is necessary to mount the female fastener, for example by welding, inside the pillar when the body is being manufactured.

Due to variations in manufacturing tolerances, a degree of position adjustment for the female fastener must be provided so that the door and body may be properly aligned during final assembly. Position adjustment is provided by using a female fastener called a "cage-nut", which is usually a nut encaged in a structure that is attached to the inside of the door pillar. The nut is provided with a range of movement within the encaging structure so that when the door is assembled to the body, the alignment of the door and the body can be adjusted until they meet manufacturing standards.

Cage-nuts are also frequently used in situations where the nut is not completely enclosed, such as on the frame of the vehicle. In these situations, the use of a cage-nut welded onto the body prior to final assembly reduces the time needed for final assembly of the automobile.

It has been found, however, that during the step of painting and baking paint on the body of the auto, that the nut will often weld or adhere to the cage. This paint-welding creates problems in the step of assembling and aligning the door or other subassembly within the body, because the nut no longer has any freedom of movement. It can be difficult to free the paint welded nut from the cage if it is in an enclosed space. Consequently, the final assembly of the automobile will be slowed while these parts are freed up enough so that the door or other subassembly can be properly aligned and assembled with the body.

Another problem associated with such cage-nut assemblies is that a bolt may be stripped or cross-threaded into the encaged nut, particularly if the nut is misaligned as a result of adhering to the cage structure. In this situation, it is difficult, if not impossible, to remove the nut and bolt for servicing because the nut may not be removable from the cage. Accordingly, it is desirable to provide an improved cage-nut design in which the frequency of paint-welding the nut to the cage structure is minimized, and the nut is removable from the cage for servicing when the bolt or nut are stripped or cross-threaded.

DISCLOSURE OF INVENTION

The present invention overcomes the above referenced shortcomings of prior art cage-nut assemblies by providing a cage-nut assembly including a Teflon-coated nut and a cage structure which provides high torsional strength while providing a structurally weak portion which allows bending of the cage structure for removal of the nut for servicing.

In a first embodiment, a flat base is provided with opposing strap portions which wrap around opposing ends of an oblong (i.e., longer than wide, including diamond shape or other shape providing a portion for containment and torsional resistance), Teflon-coated nut. The flat base forms an enclosed aperture for receiving a bolt. The straps are bendable away from the body to facilitate nut removal. The straps are configured to provide high torsional strength. Small tabs extend from the base to space the nut away from the base to prevent paint-welding of the nut to the base, and are bendable to allow the nut member to seat when torqued down.

In another embodiment, standoff legs support a flat base with an enclosed aperture formed therethrough for receiving a bolt. A rectangular Teflon-coated nut is positioned within the cage. The legs include small, bendable tabs which hold the nut in position and are bendable to allow the nut member to seat when torqued down (when a bending-force of approximately 65 lbs. is applied to the legs). One of the tabs prevents the nut from sliding out of the cage, and is bendable to allow removal and servicing of the nut (when a bending-force of approximately 10 to 20 lbs. is applied).

In a further embodiment, the cage-nut assembly includes a nut positioned within a cage structure, the cage structure being configured to provide high torsional strength to prevent rotation of the nut. Preferably, the cage structure provides sufficiently high torsional strength that the first failure would be that of the weld holding the cage structure against a workpiece when a significant torque is applied to the nut (preferably at approximately 190 Nm). The cage structure has a flat base and an at least partially open end portion. The cage structure includes a relatively structurally weak blocking member preventing the nut from exiting the cage structure through the end portion. The structurally weak blocking member is bendable when less than approximately 20 lbs. of force is applied to the blocking member to open the end portion and allow the nut to move laterally along the base through the end portion for removal of the nut. The flat base includes a bolt-receiving aperture which is formed coextensively with the at least partially open end portion. The blocking member comprises first and second curved tangs formed coplanar with the flat base. The nut includes a protruding tubular portion which extends through the bolt-receiving aperture. Standoff legs support the flat base and include small projections to facilitate projection welding.

In the various embodiments, the flat base may be positioned flat against a workpiece to which the nut is being attached, or may be spaced from the workpiece by the above-described standoff legs.

Accordingly, an object of the invention is to provide an improved cage-nut assembly in which the nut is removable from the cage for servicing.

The above object and other objects, features and advantages of the present invention are readily apparent from the following detailed description of the best modes for carrying out the invention when taken in connection with the accompanying drawings.

BRIEF DESCRIPTION OF DRAWINGS

FIG. 1 shows a perspective view of a cage structure in accordance with a first embodiment of the invention;

FIG. 2 shows a plan view of the cage structure of FIG. 1;

FIG. 3 shows a side view of the cage structure of FIG. 2;

FIG. 4 shows a cross-sectional view taken at line A—A of FIG. 2;

FIG. 14 shows a side view of the cage-nut assembly of FIG. 13 with the bolt and vehicle body component;

FIG. 15a shows a cross-sectional view taken at line 15a—15a of FIG. 14;

FIG. 15b shows a cross-sectional view of the cage-nut assembly of FIG. 15a, with the bolt torqued down and the nut seated;

FIG. 16 shows an enlarged view of detail 16 from FIG. 14;

FIG. 17 shows a plan view of the nut shown in FIG. 11;

FIG. 18 shows a side view of the nut of FIG. 17;

DETAILED DESCRIPTION OF THE PREFERRED EMBODIMENTS

Figure 7:
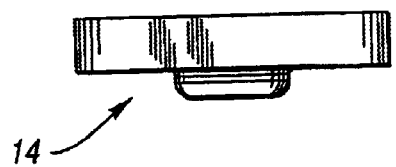
FIG. 7 shows a reverse side view of the nut of FIG. 5.

Referring to FIGS. 1–8, a first embodiment of a cage-nut assembly 10 is shown in accordance with the present invention. The cage-nut assembly 10 includes a cage structure 12, shown in FIGS. 1–4, and a Teflon-coated nut 14, shown in FIGS. 5–7, which cooperate to form the cage-nut assembly 10, shown in FIG. 8.

The cage structure 12 includes a flat base 16 having a fully enclosed aperture 18 formed therethrough for receiving a bolt (not shown). Standoff tabs 20,22 are angled slightly upwardly with respect to the flat base 16 to hold the nut 14 away from the base 16 to prevent the nut from paint-welding to the base 16 (i.e. sticking to the base by dried paint). The tabs 20,22 are bendable to allow the nut to seat when torqued down.

The base 16 is preferably a stamped steel component, and includes integral straps 24,26, which form openings 28,30, respectively, for receiving opposing ends 32,34 of the oblong nut 14. The straps 24,26 are preferably stamped with the base 16 to form the openings 28,30.

Figure 5:
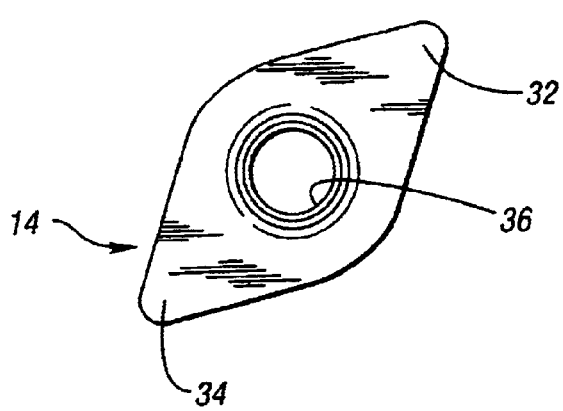
FIG. 5 shows a plan view of a nut for use with the embodiment of FIG. 1.
Figure 6:
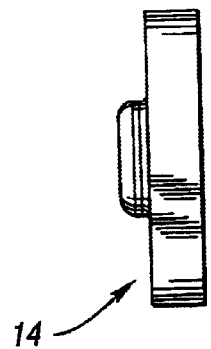
FIG. 6 shows a side view of the nut of FIG. 5.

As shown in FIGS. 5–6, the nut 14 is generally diamond-shaped and includes a central aperture 36 which is threaded to receive the bolt.

Figure 8:
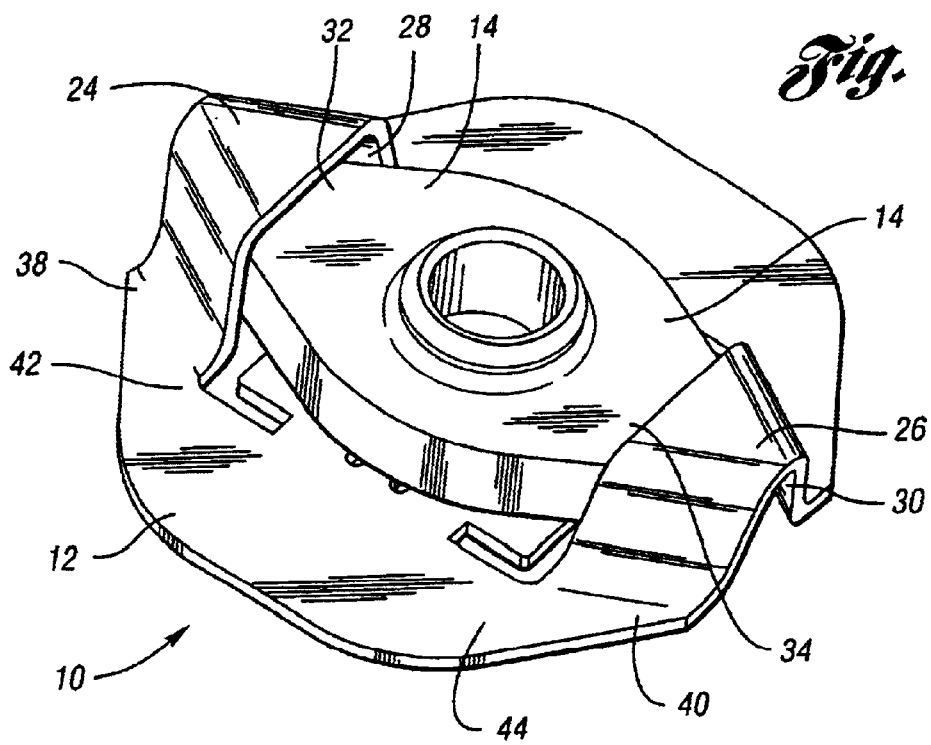
FIG. 8 shows a perspective view of a cage-nut assembly in accordance with the embodiment of FIG. 1.

As viewed in FIG. 8, the flat base 16 would be welded to a vehicle frame or other structural component, and the bolt would be inserted through an underside thereof, as viewed in this Figure. The openings 28,30 in the straps 24,26, respectively, are larger than the respective opposing ends 32,34 of the nut 14, thereby allowing the nut 14 to float for alignment with the bolt. The engagement of the opposing ends 32,34 of the nut 14 with the straps 24,26, respectively, provides very high torsional strength against rotation of the nut 14 during assembly.

The opposing ends 38,40 of the flat base 12 may be bent upward for servicing the nut 14. As the opposing ends 38,40 are pried upward, the flat base 12 would bend in the structurally weakest areas 42,44. In other words, the opposing ends 38,40 of the cage structure 12 are partially open, and the straps 24,26 are operative as blocking members which prevent the nut 14 from sliding through the partially open opposing ends 38,40. The blocking members are relatively structurally weak in a direction orthogonal to the torsional rotation direction of the nut, such that the blocking members may be pried up to allow the nut to slide through one of the opposing ends 38,40. The language "orthogonal to the torsional rotation direction of the nut" is intended to mean perpendicular to an arc swept out by a distal end of the rotating nut, and includes perpendicular directions which are in the plane of the arc or perpendicular to the plane of the arc.

Figure 9:
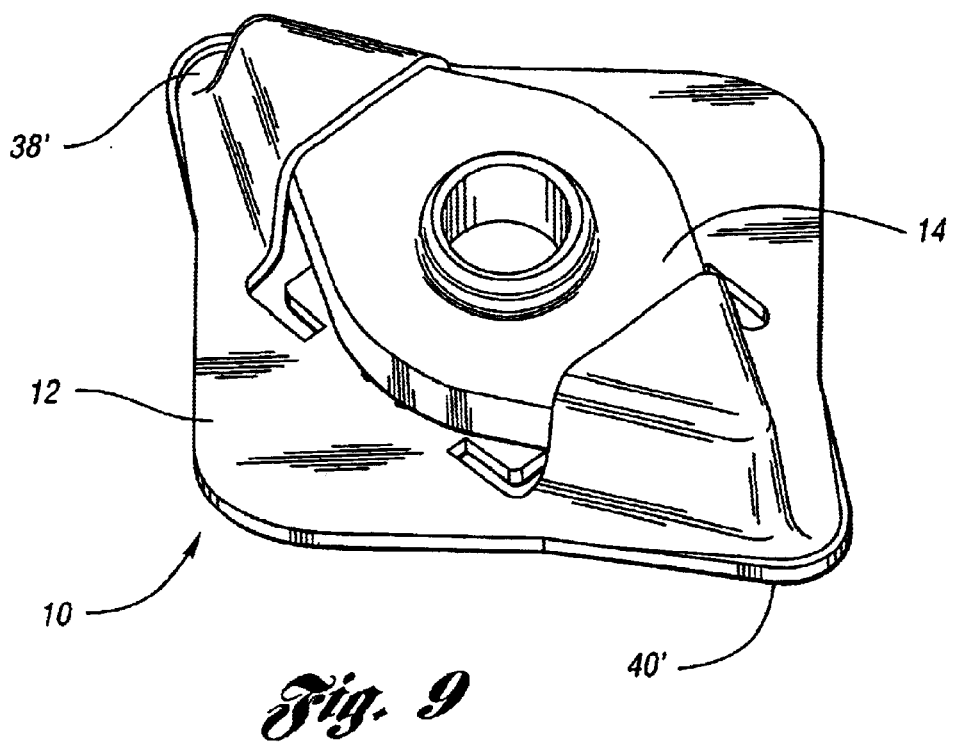
FIG. 9 shows a perspective view of a cage-nut assembly in a slightly modified embodiment.
Figure 10:
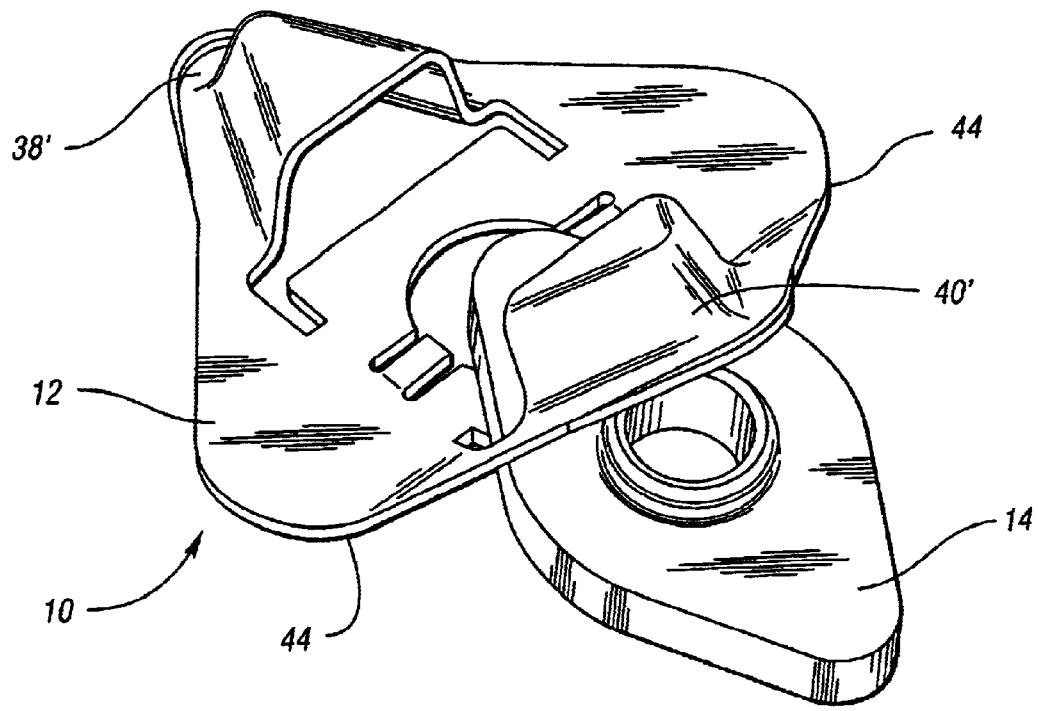
FIG. 10 shows the cage-nut assembly of FIG. 9 with the nut being removed from the cage structure.
Figure 11:
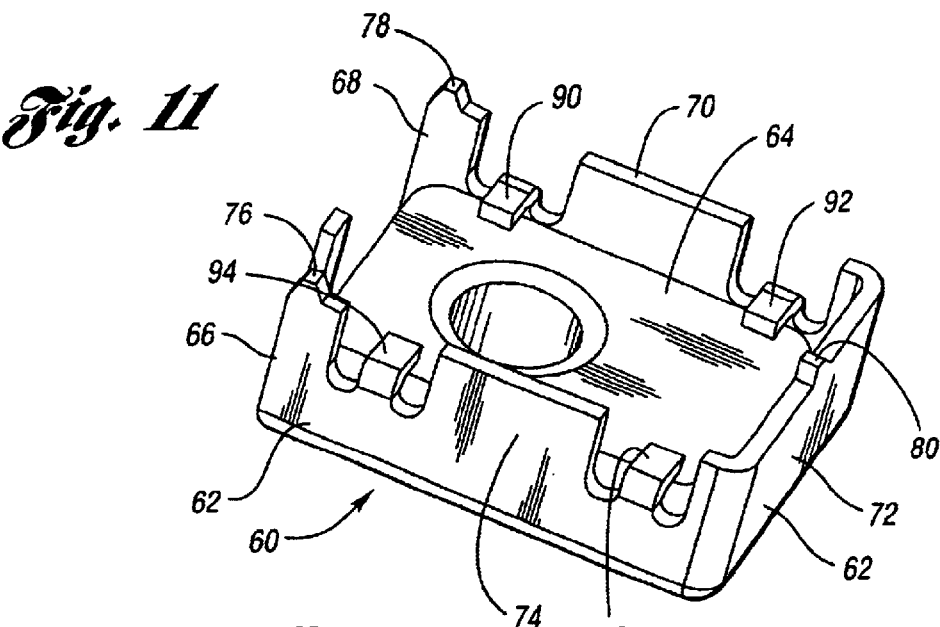
FIG. 11 shows an underside perspective view of a cage-nut assembly in accordance with an alternative embodiment of the invention.

FIGS. 9 and 10 show a slightly modified embodiment, wherein the opposing ends 38',40' are substantially enclosed. The ends 38',40' are only open at an underside thereof, as viewed in FIGS. 9 and 10. FIG. 10 illustrates the end 40' having been pried upward with respect to the flat base 12 about the structurally weak portion 44 for removal of the nut 14 for servicing.

Referring to FIGS. 11–18, a further embodiment of the invention is shown. These figures show a cage-nut assembly 60, including the cage structure 62, which is preferably a stamped steel component, and a Teflon-coated rectangular nut 64.

The cage structure 62 includes standoff legs 66,68,70,72,74 which are welded to the vehicle body component 75 by the conical projections 76,78,80, such as by projection welding or resistance welding.

Figure 12:
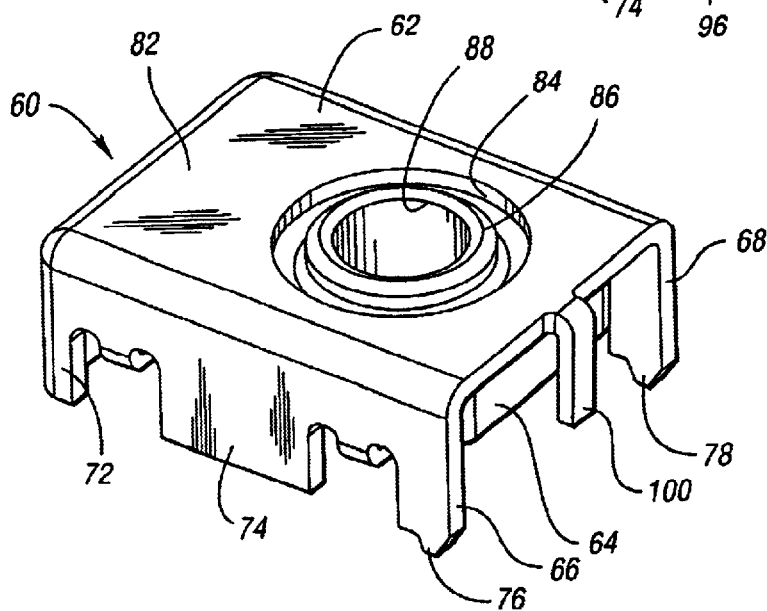
FIG. 12 shows a top perspective view of the cage-nut assembly of FIG. 11.
Figure 13:
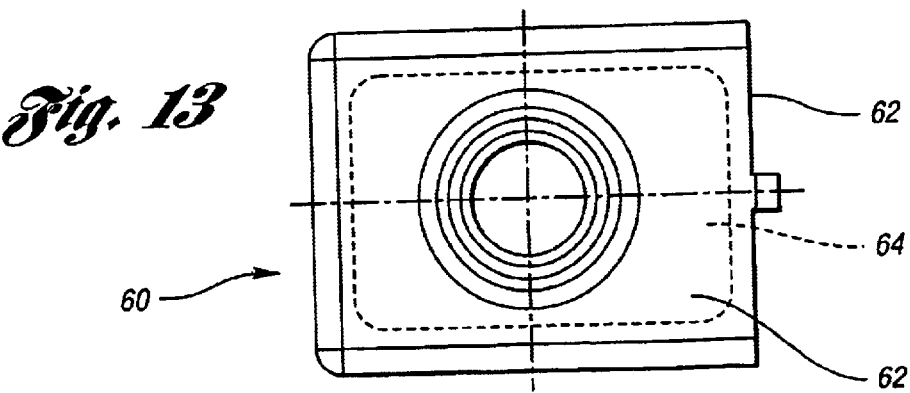
FIG. 13 shows a top plan view of the cage-nut assembly of FIG. 11.

The standoff legs 66,68,70,72,74 support a flat base 82 which has an enclosed aperture 84 formed therethrough for receiving the bolt 85 which is inserted from the vehicle body side of the cage structure 62, as shown in FIGS. 14, 15a and 15b, and protrudes through the lip 86 surrounding the threaded aperture 88 of the nut 64. The lip 86 also protrudes through the enclosed aperture 84 of the base 82, as shown in FIGS. 12 and 15a.

This cage structure 62 in combination with the rectangular nut 64 provides substantial torsional strength for supporting the nut 64 against rotation when a bolt is driven into the nut 64 (preferably the weld fails before the cage structure at around 190 Nm). Between the legs 66,68,70,72,74, vertical retainer tabs 90,92,94,96 are provided for holding the nut 64 against the base 82.

The cage structure 62 is open at the longitudinal end between legs 66,68 such that movement of the bolt 64 therethrough is prevented only by the lateral retention tab 100. Accordingly, if a bolt is cross-threaded into the nut 64, the tabs 90,92,94,96 may be bent downward simply by pulling the nut 64 away from the base 82 by pulling on the bolt. This movement will bend the retainer tabs 90,92,94,96 out of the way for downward movement of the nut 64 so that the lip 86 does not interfere with the aperture 84 as the nut 64 is slid through the opening between the legs 66,68. In order to slide the nut 64 through the opening between the legs 66,68, the lateral retention tab 100 is pried upward to a position substantially parallel to the base 82. A bending force of about 10–20 lbs. is required to bend the retention tab 100. Accordingly, the nut 64 may be removed for servicing simply by bending the tabs 90,92,94,96 to move the nut 64 away from the base 82, and then bending the lateral retention tab 100 upward to slide the nut 64 along the base out the end of the cage structure 62 between the legs 66,68.

Figure 19:
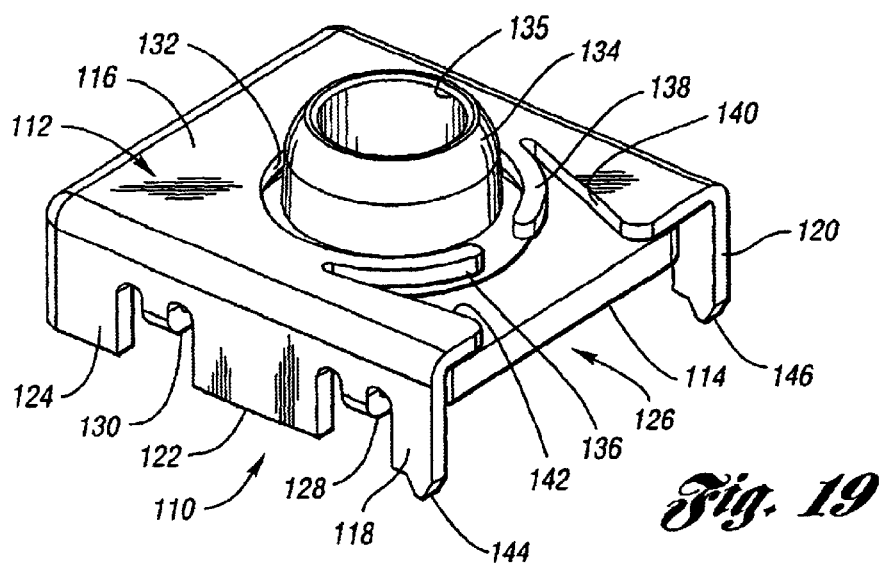
FIG. 19 shows a perspective view of a cage-nut assembly in accordance with a third embodiment of the invention.
Figure 20:
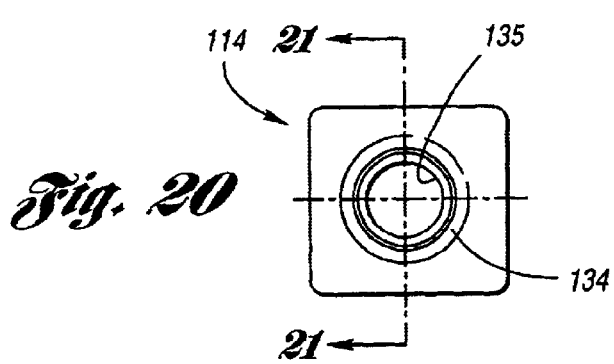
FIG. 20 shows a plan view of a nut corresponding with the embodiment of FIG. 19.
Figure 21:
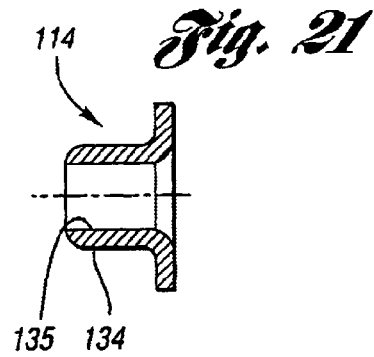
FIG. 21 shows a sectional view taken at line 21—21 of FIG. 20.

FIGS. 19–21 illustrate a third embodiment of the invention. In this embodiment, the cage-nut assembly 110 includes a cage structure 112 and a Teflon-coated nut 114, which cooperate to form the cage-nut assembly 110. The cage structure includes a flat base 116 which is supported by standoff legs 118,120,122,124. The flat base 116 and the standoff legs 118,120 cooperate to form an open end 126.

The standoff legs include bendable retainer tabs 128,130 which are configured to hold the nut 114 in position to be torqued down by a bolt. The tabs 128,130 are bendable to allow the nut 114 to move downward as viewed in FIG. 19 when torqued down to a workpiece by such a bolt. The tabs 128,130 are bendable under approximately 65–80 lbs. of bending torque. Of course, the tabs 128,130 could be configured in any variety of shapes, and the standoff legs could be combined to form a continuous support wall.

The flat base 116 includes a bolt-receiving aperture 132, which is formed coextensively with the open end 126 of the cage structure 112. The bolt-receiving aperture 132 receives a tubular extrusion 134 which extends from the nut 114. The aperture 135 of the tubular extrusion 134 receives a bolt, not shown, which torques down the nut 114.

First and second curved tangs 136,138 cooperate to form a blocking member which prevents the nut 114 from sliding along the flat base 116 through the open end 126 of the cage structure 112. The tangs 136,138 are bendable toward the angled sides 140,142, such as by a screwdriver, to allow the tubular extrusion 134 to pass by the blocking member formed by the curved tangs 136,138, thereby allowing removal of the nut.

This blocking member, like other embodiments of the invention, is configured to allow removal of the nut for servicing. Like other embodiments, the curved tangs 136, 138 are bendable when less than approximately 20 lbs. of force is applied to the curved tangs 136,138, such as by a screwdriver, and the nut 114 may then be slid along the flat base 116 through the open end 126 of the cage structure 112.

The standoff legs 118,120 include small projections 144, 146 to facilitate projection welding of the cage structure 112 to a workpiece to which the nut 114 is being attached.

Figure 23:
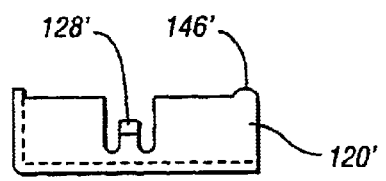
FIG. 23 shows a side view of the cage structure of FIG. 22.
Figure 22:
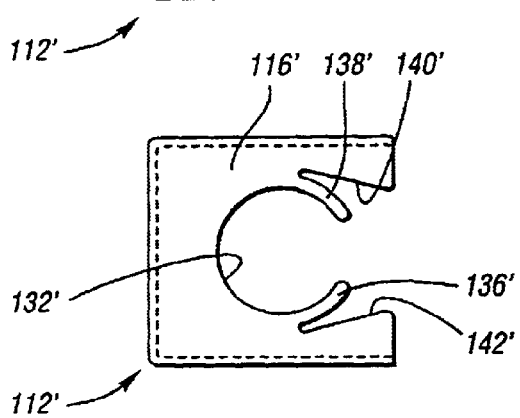
FIG. 22 shows a plan view of a slightly modified embodiment of a cage structure in accordance with the invention.
Figure 24:
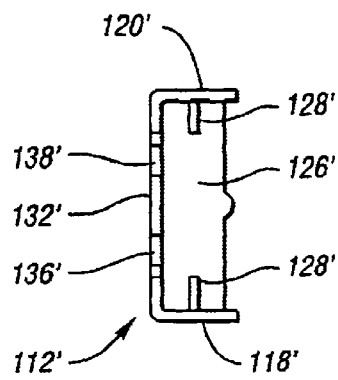
FIG. 24 shows an end view of the cage structure of FIG. 22.

FIGS. 22–24 show a slightly modified embodiment of a cage structure in accordance with the invention, wherein like reference numerals with a prime (') indicate like components from the embodiment of FIG. 19. This embodiment differs from that of FIG. 19 only in the number of bendable retainer tabs 128'. Of course, the number of retainer tabs and the number and configuration of the standoff legs could vary within the scope of the present invention.

While the best modes for carrying out the invention have been described in detail, those familiar with the art to which this invention relates will recognize various alternative designs and embodiments for practicing the invention without departing from the scope of the appended claims.

What is claimed is:

1. A cage-nut assembly, comprising:

a nut; and a cage structure having the nut therein, the cage structure including a flat base, two side portions and two end portions, a blocking member, a plurality of standoff legs for supporting the flat base, and a bendable retainer tab for holding the nut adjacent the flat base, only one of the end portions being at least partially open, the blocking member being disposed adjacent the at least partially open end portion for selectively preventing movement of the nut through the at least partially open end portion, the standoff legs being disposed along the two side portions and the end portion opposite the at least partially open end portion, the bendable retainer tab being bendable to allow movement of the nut away from the flat base in a direction normal to the flat base.

2. The cage-nut assembly of claim 1, wherein at least one of the standoff legs includes a weld projection to facilitate welding of the cage structure to a vehicle body component.

3. The cage-nut assembly of claim 1, wherein two of the standoff legs define the at least partially open end portion.

4. The cage-nut assembly of claim 1, wherein the blocking member comprises a bendable lateral retention tab extending perpendicular to the flat base and blocking the at least partially open end portion.

5. The cage-nut assembly of claim 1, wherein the flat base includes an aperture configured to receive a bolt.

6. The cage-nut assembly of claim 1, wherein the nut is Teflon-coated.

7. The cage-nut assembly of claim 1, wherein the blocking member is bendably deformable with less than 20 lb. of force to facilitate removal of the nut.

* * * * *